Jan. 26, 1960 R. LUCIEN ET AL 2,922,311
AUTOMATIC CONTROL OF THE GEAR-BOXES IN AUTOMOBILES
Filed Feb. 11, 1957 7 Sheets-Sheet 1

Fig. 2

United States Patent Office 2,922,311
Patented Jan. 26, 1960

2,922,311

AUTOMATIC CONTROL OF THE GEAR-BOXES IN AUTOMOBILES

René Lucien, Neuilly-sur-Seine, and Jean-Pierre Legros, Paris, France, assignors to Société à responsabilité limitée; Recherches Etudes Production R.E.P., Paris, France, a company of France Application February 11, 1957, Serial No. 639,467

Claims priority, application France February 15, 1956

6 Claims. (Cl. 74—336.5)

The invention relates to the automatic control of the gear-boxes in automobiles, and especially the so-called automatic gear-boxes, in which the operation of levers, carried out hitherto by hand, renders possible the transition from one combination of gears to another, in order to maintain the speed of rotation of the motor within suitable limits.

The invention principally relates to a control device for automatically effecting the transition from one combination of gears to another for given speeds of the vehicle.

For example, supposing that the gear-box comprises four combinations of gears for forward travel, i.e., a first combination corresponding to the speeds of the vehicle increasing between 0 and $v_1$, a second to the increasing speeds comprised between $v_1$ and $v_2$, a third to the increasing speeds between $v_2$ and $v_3$, and a fourth to the speeds greater than $v_3$, the device according to the invention ensures automatically the transition from the first combination to the second when the vehicle attains the speed $v_1$, from the second to the third when the vehicle attains the speed $v_2$ and from the third to the fourth when the vehicle attains the speed $v_3$.

Conversely, the device ensures the transition from the fourth combination to the third, then to the second, then to the first when the vehicle, on slowing down, passes successively through decreasing speeds $v'_3$, $v'_2$, $v'_1$, the speeds $v'$ being respectively slightly less than the corresponding speeds $v$.

A further object of the invention is to provide a device which renders it possible, at the will of the driver, to modify the ranges of speeds $0$—$v_1$, $v_1$—$v_2$, $v_2$—$v_3$, and respectively $v'_3$—$v'_2$, $v'_2$—$v'_1$, —$v'_0$, in other words, the realisation of a device which renders it possible, by a simple operation of the driver, to pass from one combination of gears to another for the respective speeds $w_1$, $w_2$, $w_3$, $w'_3$, $w'_2$, $w'_1$, which are different from $v_1$, $v_2$, $v_3$, $v'_3$, $v'_2$, $v'_1$.

A further object of the invention is the automatic control of disengaging on the passage from one combination to another and, at the same time, the operation of a throttle-valve on the pipe supplying the combustion gases in order to limit automatically the speed of the disengaged motor.

A further object of the invention is to realise an automatic device for the control of the gearbox such that the passage from one combination of gears of the gearbox to the higher combination is automatically made impossible while the vehicle possesses with the combination which is engaged, an acceleration greater than a given value.

A further object of the invention is the automatic control of disengaging when the speed of the motor becomes less than a critical speed in order to prevent the stalling of the motor.

A further object of the invention relates to different safety devices which prevent any false manoeuvre and in particular avert the starting of the motor when in gear and the passage from one combination of gears of the gear-box to another before the prior combination of gears has been disengaged.

In accordance with one of the essential features of the invention, the control of the different levers of the gear-box and the disengaging is effected by means of jacks actuated by a fluid under pressure and controlled by individual electrically-operated valves which receive, in the form of electrical impulses, the orders given, as a function of the speed of the vehicle, by a speed selector driven in rotation by the transmission.

The said selector is itself characterised in that it comprises switches formed by leaves of springs provided with heads, fixed, by one of their ends, to the rotor of the selector and parallel to its spindle, the free end of each leaf being arranged between two stops spaced radially from one another, forming an electrical contact and carried by an insulated part which is solid with the said rotor, the said leaves being pre-stressed in such a way as to ensure the electrical contact with the nearest stop of the spindle while the speed of rotation of the said rotor is less than a given speed and to be, in the contrary case, projected by the centrifugal force acting on the head, thus breaking the said contact and ensuring the electrical contact with the most remote stop of the spindle, the said stops being connected electrically, the first to the electrically-operated valve controlling a speed combination of the gear-box, the other to the electrically-operated valve controlling the combination of higher speed, the different spring leaves being distributed angularly about the axis of rotation and differing from one another either by the degree of their pre-stressing, or by the weight of the head.

These and other features of the invention will appear from the following description of one form of embodiment of the device of the invention, applied by way of non-limitative example to a gear-box with two levers.

It is illustrated in the drawing attached hereto, in which.

Figure 1:
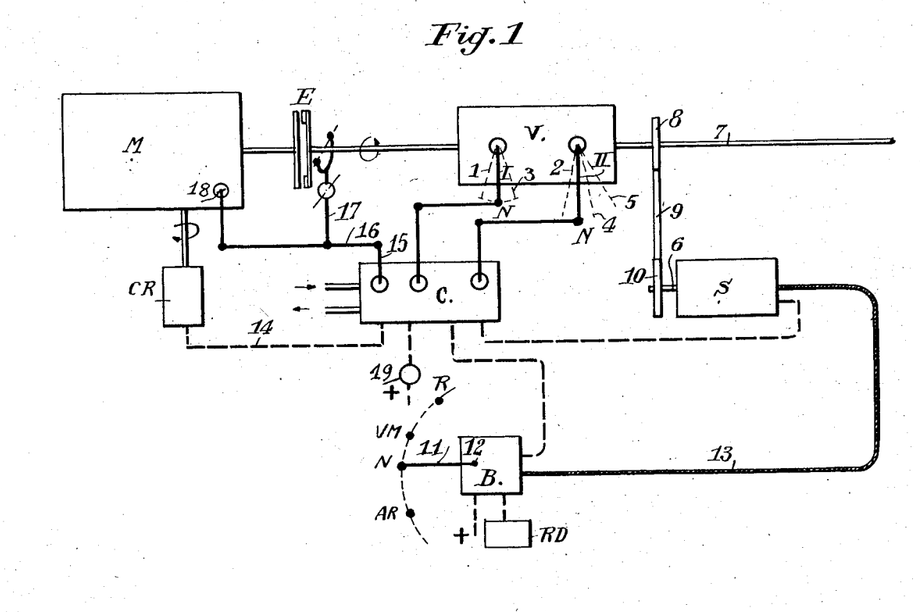
Figure 1 is a general diagram of the device.

With reference to Figure 1:

The motor M drives the transmission, as in all automobile vehicles with internal combustion engines, through the medium of a clutch E and of a gear-box V. This latter is supposed to have four forward travel speeds and one reverse travel speed. The combinations of speeds, 1 and 3 for example, are given by the lever I, in positions 1 and 3, the two others 2 and 4 by the lever II, in positions 2 and 4. In the drawing, the linkage rods surrounded by a small circle are fixed, the others marked by a black point are movable. Each lever has also a neutral position N (combinations not engaged). The lever II has, in addition, a position 5 of reverse travel.

The passage from one speed to another is effected by means of hydraulic jacks (not shown), controlled by electrically-operated valves situated in a control box C. These jacks act on the linkage rods of the box C in order to place the levers I and II in the various positions indicated above.

The electrically-operated valves controlling the forward speeds operate under the control of a speed selector S, which will later on be described in detail. This selector controls the changes of position of the levers of the gearbox as a function of the speed of the vehicle, by means of a rotary member of which the shaft 6 is driven in rotation, for example by means of the shaft 7 at the gearbox outlet, through a transmission 8—9—10.

At B there is an operating box for the few operations which have to be carried out by the driver. An operating lever 11, which is capable of occupying several angular positions about the spindle 12, permits the driver to act electrically on the selector and on the control box C so as to control, by the action of jacks, on the one hand, at position N, the placing of the levers of the gear-box into neutral position and, on the other hand, into the position AR, the coupling of the reverse travel gears.

In addition, the lever 11 enables the driver to act mechanically through a Bowden cable 13 on a member of the selector S in order to change the ranges of speeds. By changing of the ranges of speeds there is understood the possibility available to the driver, as has been mentioned above, of causing a variation of the effective speed limits of the vehicle which produce the changing of gear combinations. This variation of the ranges of speeds enables the speeds of exchange of combinations to be adapted to the conditions of the route. On town and mountain routes, it is necessary to be able to apply the brake to the motor and to be able to accelerate quickly; with this in view, it is necessary that the speeds at which the change of combinations takes place should be high. On routes which are straightforward, on the other hand, it is important that the changes of combination take place at relatively lower speeds, with a view to saving fuel and more silent running of the motor. To this end, the position R of the operating lever 11 adjusts the selector to the so-called "road" range, and the position VM to the so-called "town-mountain" range. The description of the device effecting this change of range will be given later on.

To prevent the motor stalling when the speed is too low, there has been provided a device CR, to be driven in rotation by the motor, which device acts electrically through the connection 14 on one of the electrically-operated valves of the control box C, in order, through the operation of the levers 15, 16, 17, to disengage the motor and to re-engage it when it has again worked up a sufficient speed. At the same time as the disengaging is effected, the lever 16 actuates a throttle-valve 18 in the gas suction pipe, to prevent the motor racing.

There has also been provided a starter relay RD in connection with the manual control box B.

Under certain conditions, it is not expedient for the change of speed to function, for example at the moment when the vehicle is on the point of overtaking another, if it has a sufficient acceleration available. There has therefore been provided in addition an inertia flywheel device, of the accelerometer type, which cuts the current supplying the electrically-operated valves which control the gear-box when the vehicle is running at an accelerated pace, the acceleration of which exceeds a certain value. This device will be described later on; but it was necessary to mention it here before going on to describe, with reference to the diagram of Figure 2, the electrical circuits of the installation.

The part C framed in dotted lines corresponds to the control box C of Figure 1; the enclosed part S likewise corresponds to the selector S. The general contact 19 (Figures 1 and 2) closes the current on an electrically-operated valve EVD, for the engaging and disengaging. This latter, practically, is housed in the control box C, and, when it is under tension, it disengages the motor through the operation of levers 15, 16, 17. As has been stated above, the slow speed device CR, through its contact 20, supplies current to the electrically-operated valve EVD when the speed of rotation is too low, and this disengages the motor.

Figure 2:
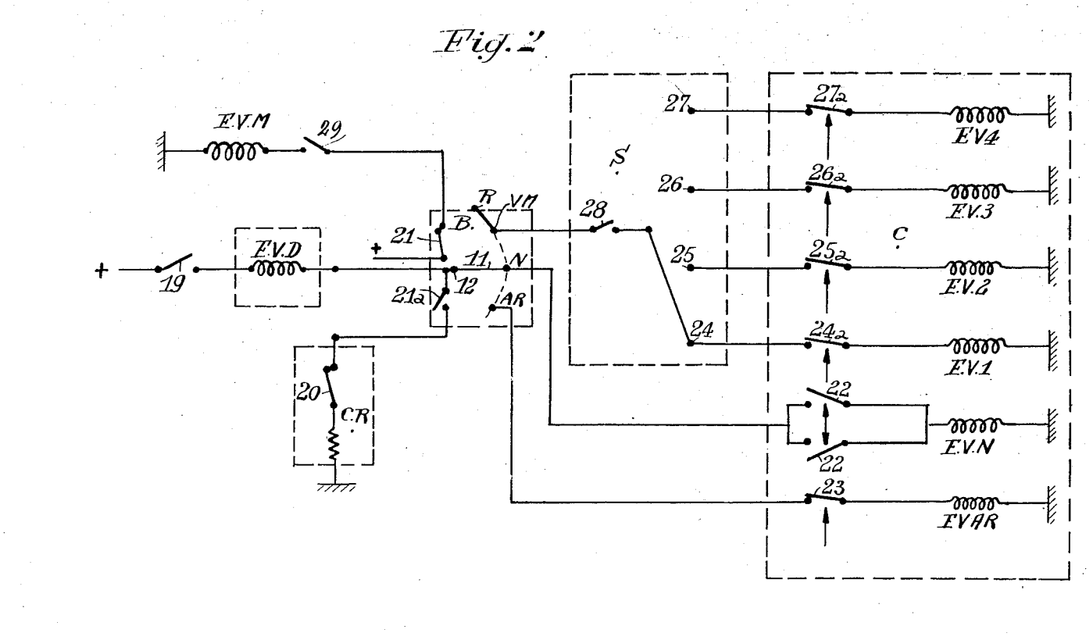
Figure 2, a general diagram of the electrical connections.

The manual control box is shown at B, with its operating lever 11, which can occupy the positions AR, N, VM and R giving the current respectively to the electrically-operated valves of the control box C: EVAR for reverse travel, EVN, for placing in neutral position and EV1, EV2, EV3, and EV4 for forward travel (1st, 2nd, 3rd and 4th speed); through the selector S which chooses the circuit to be utilised.

The placing of the lever 11 at the point N places the electrically-operated disengaging valve EVD in contact with earth across the two contacts 22, mounted in parallel, of the electrically-operated valve EVN, so that the two electrically-operated valves are excited so long as one of the contacts 22 is closed, each of them opening when the levers I and II are placed in the middle position by the jacks, as will be seen later on. In this position the contact 21 is closed, thus permitting the car to move. In addition the contact 21a is open, which eliminates the slow speed control CR which is useless in this case as the box is at neutral, and even a nuisance, causing the risk of allowing the motor to be disengaged over long periods.

The placing of the lever 11 in the position AR closes the contact 21a and puts the slow speed control into operation, excites the electrically-operated valve EVAR, which places the corresponding lever of the gear-box into the position for reverse travel, and the car goes back as soon as the disengaging ceases on the motor turning more quickly than the slow-down. At the end of the stroke of the reverse travel jack, this latter acts on the switch 23 and cuts the current. In the position VM or R the lever 11 supplies current through the selector S successively through the contacts 24, 25, 26, 27 to the electrically-operated valves $EV_1$, $EV_2$, $EV_3$, $EV_4$ of the box C, either in the ascending order, or in the descending order, in accordance with the changes of pace of the vehicle due either to the action of the driver, or to the gradient of the road, the excitation being however interrupted by the switch 28 of the accelerometer which prevents the passage from one combination of the gear-box to the higher combination, so long as the acceleration of the vehicle has not fallen below a certain value. As will be seen later on, the contact 24a is automatically cut when the selector S feeds the contact 25; in the same way the contact 25a is cut when the selector supplies the contact 26, and so on for the contacts 26a, 27a, in one direction as well as the other.

The slow-down control is likewise closed (contact 21a).

Up till now, the motor has been assumed to be moving. Causing the motor to travel is effected in the following manner:

A starting relay EVM is excited by an independent electrical circuit. This latter is placed under tension by a switch 29 in series with the switch 21 provided on the manual control box B. This switch 21 is connected mechanically to the lever 11 of the box B in such a way that it is formed only when the lever 11 is in the position N for the putting of the levers of the gear-box into neutral position.

There will now be described in detail, referring to Figures 3 and 4, the speed selector S and, first of all, the accelerometer which is associated with it.

In the box S there turns a shaft 30, equivalent to the shaft 6 of Figure 1, driven by the pulley 10 of Figure 1, and of which the speed is in consequence proportional to that of the vehicle. On the shaft 30 there can oscillate an inertia flywheel 31 to which it is connected by a spiral spring 32, of which the inner end 33 is fixed to the shaft 30, and the outer end 34 to the flywheel. On the shaft there is fixed a ring 35 carrying an arm 36. On the flywheel there is a stop 37, against which the arm 36 rests owing to the fact that the spring 32 is pre-stressed. Because of this, at a non-uniform speed, as long as the acceleration does not exceed a given value, the shaft 30, through the medium of the spring 32, drives the flywheel in its rotation and at its own speed. On the other hand, as soon as the angular acceleration of the shaft exceeds a given value, the latter moves faster relatively to the flywheel, increasing the tension of the spring 32 in such a way that the arm 36 leaves the stop 37. The flywheel 31 is connected, as will be seen later on, through a commutator and a friction contact on same, to the contact stud VM of Figure 2. The current is conducted, through the mass of the flywheel 31, to the leaf of a conducting spring 39, solid with the ring 35, and suitably insulated from the same.

If the vehicle is decelerating or moving at uniform speed, or does not attain a given acceleration, the spring 39 rests on the flywheel 31, the current passes into the leaf 39. On the other hand, if the acceleration exceeds a certain value, the flywheel is displaced relatively to the ring 35 and the spring 39 comes to bear on an insulating stud, 38, of the flywheel 31, which prevents the passage of current into the leaf 39 and makes the speed selector unable to function. This is the device which is shown diagrammatically at 28 on Figure 2.

The speed selector proper will now be described. The spring 39 is connected to the leaf of the spring 41a, fixed to the ring 35 by the screw 42. Two other leaves 41b, 41c, are similarly arranged, at 120° on each side of the leaf 41a. These leaves of springs, possessing different pre-stressings, are provided with heads such as 43a which, at rest, rest on conducting stops such as 44a spaced at 120° over the circumference of a circular groove 40 of an insulated disc 46 solid with the shaft 30. Opposite the conducting stops such as 44a there are other conducting stops such as 45a. The terminals 44a, 44b, 44c, and 45a, 45b, 45c, are connected, in accordance with the diagram of Figure 4, to commutators 46a, 46b, 46c, 46d, of the disc 46; on each of the commutators there is a brush connected respectively to the electrically-operated valves EV$_1$, EV$_2$, EV$_3$, EV$_4$ of Figure 2. On the disc 46 there is likewise a commutator 46e connected, on the one hand by a brush to the conductor R—VM of forward travel in the box B, and on the other hand to the flywheel 31. It is through this that the current is fed from the terminal VM to the flywheel 31, as has been stated above.

Figure 3:
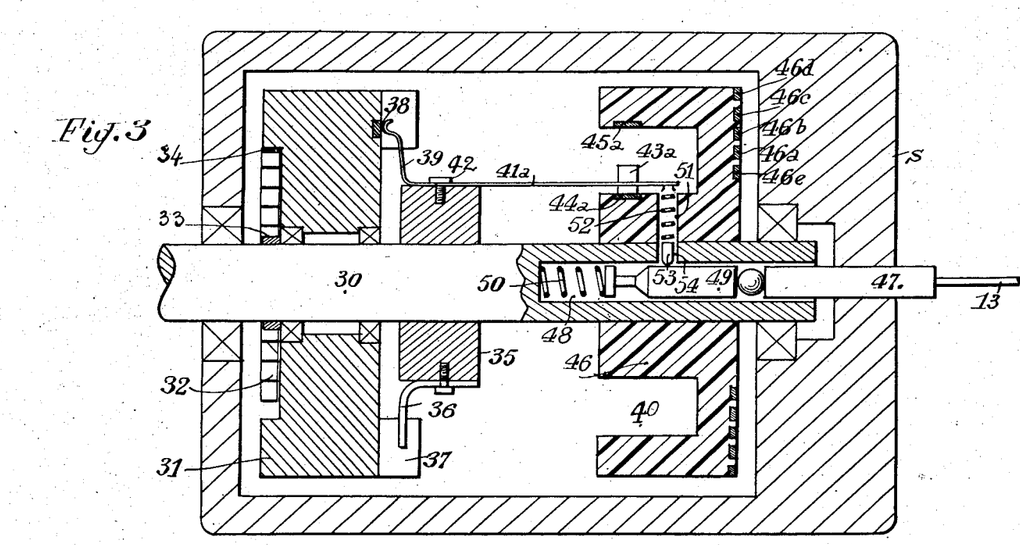
Figure 3, an axial cross-section of the speed selector.
Figure 4:
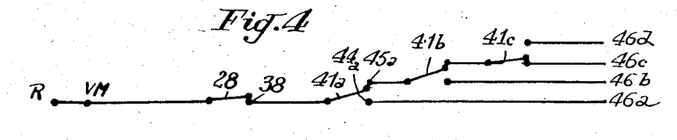
Figure 4, an expanded diagram of the connections of the speed selector.

On referring to Figures 2 to 4 it can be seen that the vehicle being at a standstill, the fact of causing the operating lever 11 to pass from the position N to the position VM or R, the accelerometer contact 28 being closed, allows the current to pass into the commutator 46a, the head 43a resting then on the stud 44a, and from the head into the only electrically-operated valve EV$_1$ controlling the "low speed" combination of the gear-box. Matters remain in this state until, the speed of the vehicle increasing as desired by the driver, through the operation of the accelerator, the centrifugal force acting on the head 43a of the spring 41a breaks the contact 43a—44a. At this moment a clean break is produced, for the more the space is increased, the more the centrifugal force increases and tends to augment the space and, as the leaves 41 have been chosen supple intentionally, the head 43a is immediately thrown against the contact 45a which, feeding the commutator 46b, throws in the "two" combination of the gear-box and so on until the "four" combination, if the driver presses on the accelerator until a sufficient speed is obtained. It has been understood that for matters to proceed in this way the pre-stressings of the spring leaves 41a, 41b, 41c must increase in the order a, b, c. A sufficient reduction of the speed of the vehicle will in the same way cause the reverse movements of the combinations of the gear-box. It is to be noted, however, that if the interval between the contacts 44 and 45 has been chosen sufficiently large, small variations of the speed of travel of the vehicle will not be sufficient to bring the heads 43 from one contact 45 to the contact 44 and that, by this arrangement, disagreeable knocking due to too frequent changes of combination of the gear-box are avoided.

It has been seen, on the other hand, that owing to the inertia flywheel device 31 an undesired change of combination is prevented, as long as the driver has available a sufficient reserve of power.

It is obvious that the leaves 41, instead of differing from one another by their degree of pre-stressing, could have the same pre-stressing and carry heads 43 of differing weight.

It has already been stated that, by means of the operating lever 11 of Figure 1 and the Bowden cable 13, one could act mechanically on the selector S in order to modify the range of speeds corresponding to each stage of the gear-box. This aim will be reached if one operates the successive passages of the combinations of the gear-box at higher or lower respective speeds of the vehicle than those which cause the leaves of springs 41a, 41b, 41c, to bend owing to the action of the centrifugal force acting on their respective heads.

The cable with Bowden sheath 13 is terminated by a push-rod 47 (Figure 3) which penetrates into a cylindrical recess 48 of the shaft 30, coaxial with same. In this recess there are housed a cylindro-conical rod 49 and a spring 50 which opposes the action of the push-rod 47. In the disc 46 there are arranged, to the right of the spring leaves 41, radial recesses 51 in which are housed the springs 52. These springs can be acted upon by push-rods 53 housed in orifices 54 which make communication between recesses 48 and 51. The rod can occupy two positions. In one, that of Figure 3, the rod 49 presses the push-rods 53 on the springs 52 against the spring leaves 41. This position corresponds to the so-called road travel. The springs 52 add their effect to that of the centrifugal force. In the other position of the rod 49, corresponding to the "town-mountain" position of the manual control lever 11 of Figure 1, the rod 49 is pushed towards the right and the springs 52 are without effect on the leaves 41. The result of this is that the electrically-operated valves EV$_1$, EV$_2$ . . . will then be excited for vehicle speeds W$_1$, W$_2$, W$_3$ . . . respectively higher than the speeds V$_1$, V$_2$, V$_3$ which previously put into mesh the gear combinations of the gear-box.

There will now be described, with reference to Figures 5 to 12, the device through which the electrical orders received from the selector, from the slow-down control and from the hand control lever are transformed into mechanical operations which act on the gear-box and the clutch owing to the energy of the fluid under pressure, for example hydraulic, fed through a channel of oil under pressure.

For this purpose the device comprises:

An electric junction box for carrying out the diagram of Figure 2;

The electrically-operated valves EV of the diagram of Figure 2;

The control jacks;

The electrical connections of Figures 2 and 4.

The junction box is a conventional junction box which it is not necessary to describe here, as there is nothing special about it. If required it can be dissociated from the case.

A preferred type of electrically-operated valve will be described later on.

Figure 5:
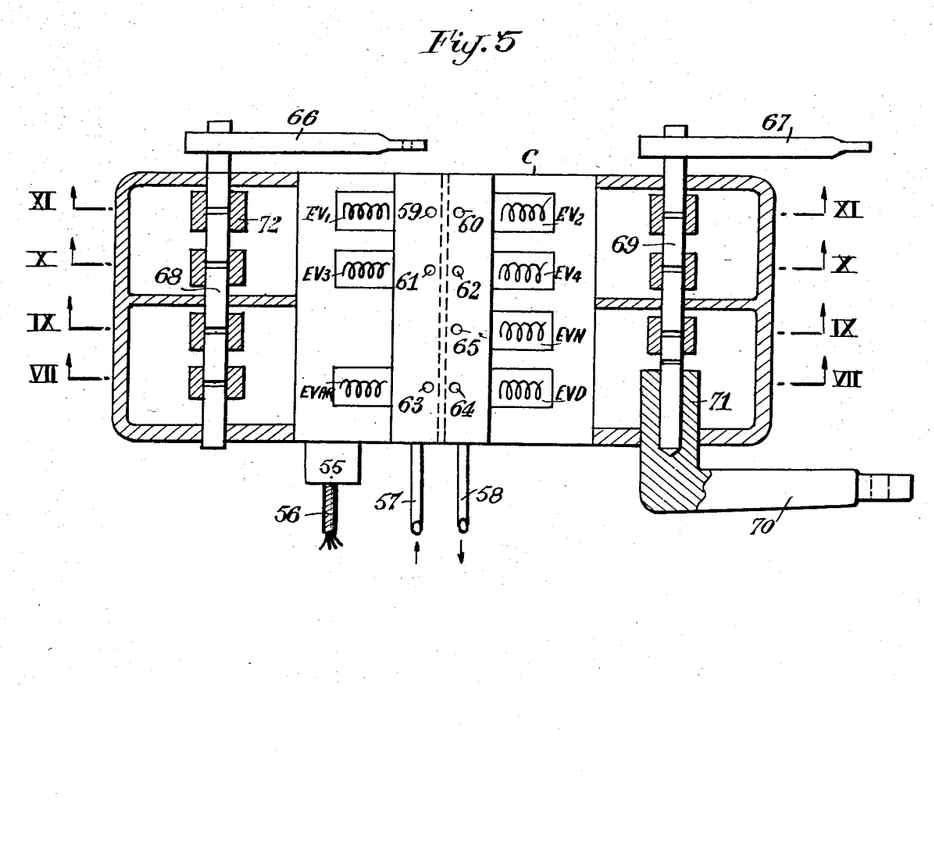
Figure 5, a view partially from above and partially in horizontal cross-section of the control box.

In Figure 5, which represents the control box C in horizontal cross-section through the spindles of the speed levers, there is shown at 55 the junction box with the sleeve 56 of the connecting wires; at 57 and 58 an inlet pipe for oil under pressure and a pipe for return to the tank. The oil under pressure is fed, through the orifices 59 to 62 to the different electrically-operated valves $EV_1$ to $EV_4$ for the forward travel speeds, through the orifice 63 to the electrically-operated valve EVAR for reverse travel, through the orifice 65 to the electrically-operated valve EVN for neutral position and through the orifice 64 to the electrically-operated disengagement valve EVD.

In this box, of the type with four forward speeds, the speed combination levers, which actuate the levers I and II of Figure 1, are shown at 66 and 67. They are fixed respectively to the control spindles 68, 69. A disengagement lever 70, which pivots at 71 on the spindle 69, ensures the disengaging. It corresponds, in this example of embodiment, to the lever 15 of Figure 1.

The spindle 68 is capable of occupying three different angular positions of which two ensure two forward speed combinations and the other, intermediary, the positioning to the neutral point; the spindle 69 is capable of occupying four different positions of which two for forward speed combinations, one intermediary, corresponding to the neutral point, and one extreme, for reverse speed. The positions for placing the two spindles at the neutral point are controlled by the electrically-operated valve EVN. It is of importance, when the order to change the speed combination is given by the selector, that the following operations should be carried out successively:

(1) Declutch;
(2) Disengage the previous combination (placing the levers in neutral position);
(3) Engage the new combination;
(4) Reclutch.

These operations are effected by means of hydraulic jacks which act on individual levers located in the control box and solid respectively with the spindles 68, 69 and 71 through the locking collars 72.

In order to carry out these operations in the order indicated, the hydraulic feeding of all the electrically-operated speed valves receiving the orders from the selector is effected through the disengaging jack, forming distributor, of which the electrically-operated valve is excited at the same time as the electrically-operated disengaging valve.

Figure 6:
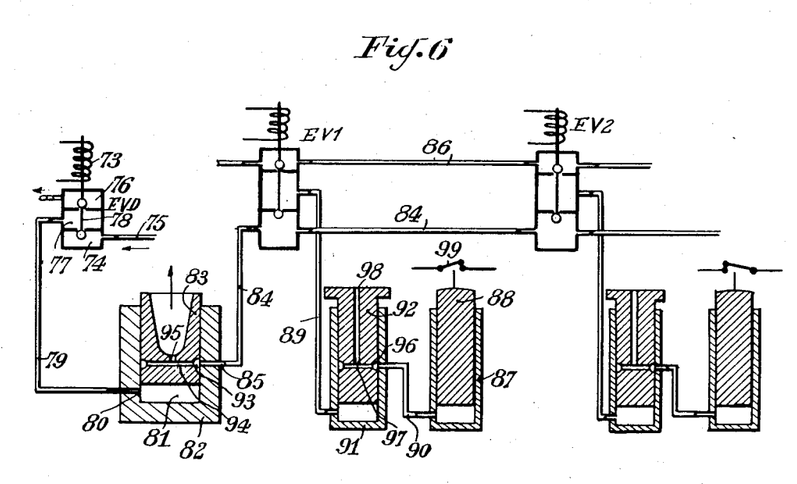
Figure 6, a partial diagrammatic view of the hydraulic circuit.

The diagram of the hydraulic installation is given in Figure 6.

In this figure the electrically-operated valve for disengaging is seen at EVD, excited by the winding 73. The electrically-operated valve EVD comprises a high-pressure chamber 74 receiving the hydraulic fluid through a pressure pipe 75, and a chamber 76 for the return to the tank. These two chambers are separated by a so-called utilisation chamber 77 which, through the operation of the double valve 78 actuated by the coil 73, is placed into communication with the one or the other of the chambers 74 or 76. The utilisation chamber 77 is in communication through the pipe 79 and the orifice 80 with the pressure chamber 81 of the disengaging jack 82 in which there moves a piston 83 which acts, owing to the effect of the pressure, on the disengaging lever (not shown) solid with the spindle 71 of Figure 6 to bring about the disengagement. The electrically operated speed valves $EV_1$, $EV_2$ ... etc., of the same type as EVD, have their pressure chambers connected to a pressure pipe 84 which receives the fluid under pressure coming from the chamber 81 of the disengaging jack 82. This pressure pipe 84 is connected with an orifice 85 of the disengaging jack. This orifice is only uncovered by the piston 83 after the latter has been placed in the disengaging position. The outlet chambers of the electrically-operated valves are connected to a general evacuation conduit 86. The jack for the putting into mesh of the speed combination No. 1, shown at 87, which acts through its piston 88, on one of the levers of the spindle 68 (Figure 5) is connected to the utilisation chamber of its electrically-operated valve $EV_1$ through the individual conduits 89—90 across a safety jack 91 of which the purpose will be explained later on. The same device is present for the jacks of 2nd, 3rd and 4th speeds.

It will be understood that as the electrically-operated valves EVD and $EV_1$ are excited simultaneously, pressure cannot be admitted into the jack for first speed until after the disengaging by the disengaging jack 82 has been effected and after the safety jack 91 has, by the delivery of its piston 92, placed the conduits 89 and 90 in communication.

The function of the jack 91 is to bring the spindle 69 back into the neutral position, should it not be there already. Thus two speed combinations cannot be engaged simultaneously. All the speed combinations being controlled in the same manner, safety is ensured for the passage from any one speed combination to that which follows it or that which precedes it.

It will be noted that the piston 83 of the disengaging jack has on its periphery a circular groove 93, in communication, through two piercings 94, 95, with the exterior. In its position of rest, that is to say, in the engaged position, this piston 83, pulled back by the usual spring, occupies the position of Figure 6. It will be seen that thus all the pressure chambers of the electrically-operated valves $EV_1$, $EV_2$ ... etc. are placed at exhaust through the orifice 95, and that no false movement can occur. The pistons 88 and 92 of the speed combination jacks are pulled back by the springs (not shown), into the position of Figure 6, when their electrically-operated valves, being no longer excited, are placed at exhaust. The return to this position of the piston 88 is possible, as the pressure chamber of the jack 87 is placed at exhaust through the conduit 90, the circular groove 96 and the conduits 97, 98. An electrical contact will also be noted at 99 which is cut by the piston 88 at the end of its forward stroke and which thus cuts the current of the corresponding electrically-operated valve as soon as the speed combination has been engaged, thus placing the electrically-operated valve at exhaust.

Owing to the safety means which have just been described, the installation is free from tension, hydraulic or electrical, as soon as an operation has been carried out, which ensures complete safety.

Figure 12:
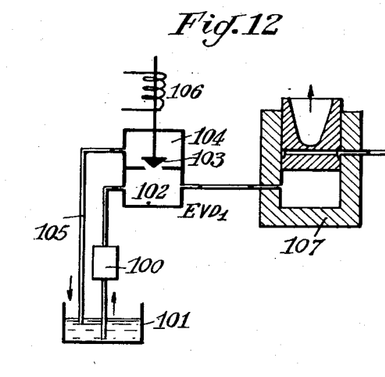
Figure 12 is a modification of Figure 6.

Figure 12 shows as a modification a so-called "open centre" hydraulic distribution. In this a pump 100, continuously drawing a liquid from a tank 101, delivers it into a compartment 102 of an electrically-operated disengaging valve $EVD_1$, which can be separated by a valve 103 from a chamber 104, from which the liquid returns to the tank through the conduit 105. The valve is actuated by the electromagnet 106 and is closed when the latter is energised. The pressure is then admitted as previously into the disengaging jack 107 connected, as in Figure 6, to the electrically-operated valves $EV_1$, $EV_2$, etc. ... which are all of the same type as the electrically-operated valve $EVD_1$. These are connected as previously described to the speed combination jacks.

Figures 7 to 11 show, by way of example, a practical embodiment of the part of the control box C containing the hydraulic jacks controlling the different combinations of the gear-box. In these figures there are found again at 68—69 the two control spindles of the speed levers 66, 67 and the disengaging spindle 71.

Figures 7, 9:
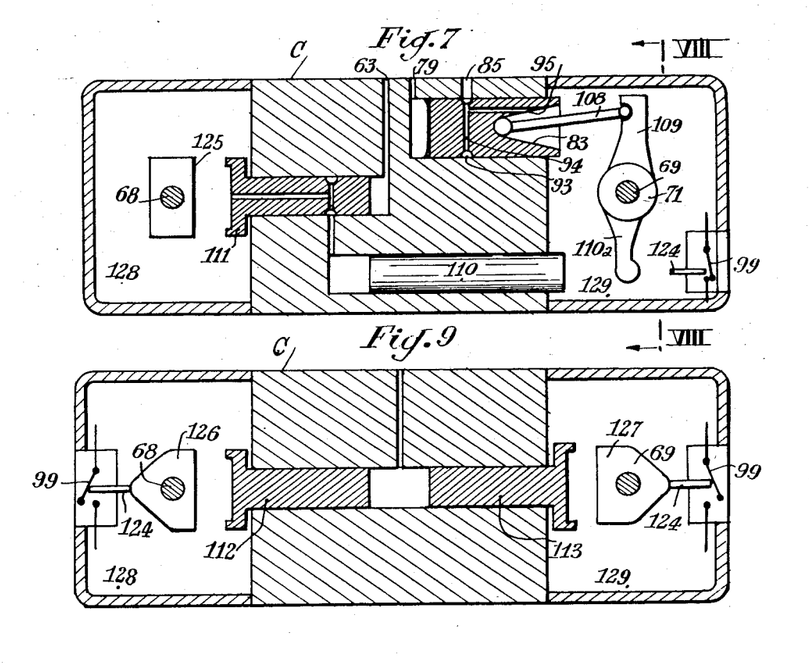
Figure 7, a cross-section along the line VII—VII of Figure 5.
Figures 9, 10, 11, cross-sections along the lines IX—IX, X—X, XI—XI of Figure 5.
Figure 8:
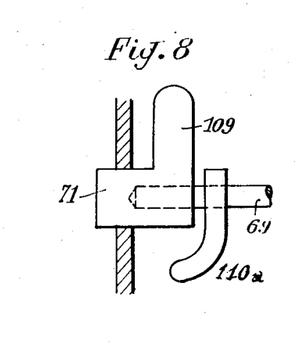
Figure 8, a part of the cross-section along the line VIII—VIII of Figure 7.

In Figure 7 there is seen at 83 the piston of the disengaging jack which, at each operation of putting a speed combination into gear, commences by ensuring the disengagement. By pushing the lever 109, through the rod 108, it causes the spindle 71 to turn about the spindle 69, and effects the disengagement by transmission levers which are not shown. In the same drawing there is shown at 110 the jack for reverse movement with its safety jack 111. They are actuated by the electrically-operated valve EVAR admitting the fluid under pressure into the conduit 63.

Figure 9 shows the two jacks 112—113 for placing the levers in the neutral position, on actuation of the electrically-operated valve EVN controlled by the driver by means of the lever 11 of the manual control box B (Figure 1).

Figure 10:
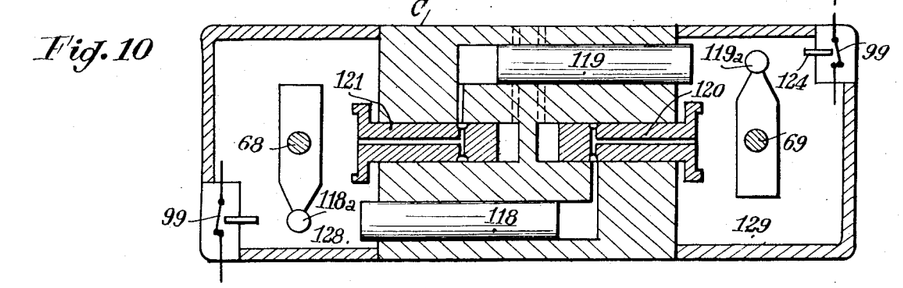
Figure 11:
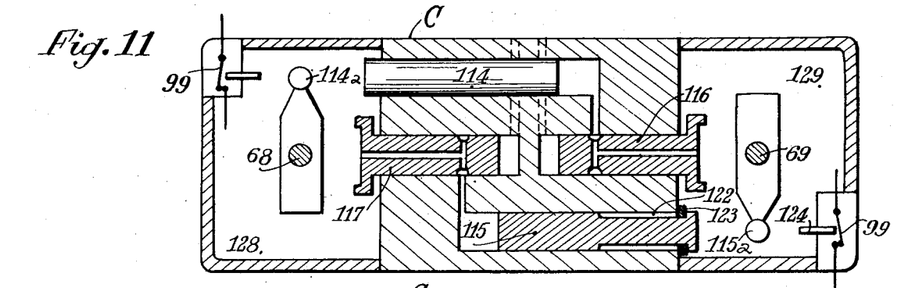

Figure 11 shows the jacks 114, 115 respectively for 3rd and 4th combinations of forward movement of the gear-box with their respective safety jacks 116, 117, and Figure 10 shows the jacks 118, 119 respectively of 1st and 2nd combinations of forward travel, with their safety jacks 120—121.

Levers 110a—114a—115a—118a—119a are keyed alternately to the shafts 68 and 69 and they each end in a cylindrical head situated opposite the piston of the control jack having the same reference number. At rest, the control jacks of the gear-box combinations, their safety jacks and the corresponding levers occupy the positions of Figures 7 to 11.

The jacks for forward speeds 114—115—118—119 have their extension stroke limited, as indicated for 115 (Figure 11) by grooves 122 co-operating with fixed stops 123. Owing to the action of these jacks for forward movement, the levers 114a and 118a keyed to the spindle 68 can occupy two extreme angular positions inclined in opposite directions; the same applies to the levers 115a, 119a keyed to the spindle 69, giving two extreme angular positions of each of the two spindles. Each of these positions corresponds to the putting into mesh of a combination of gears for forward movement. In each of these extreme positions, a contact 99 is opened by the abutment of the corresponding speed lever onto a push-rod 124. The opening of these contacts cuts the current on the corresponding electrically-operated valve, as has been stated above. Reverting to Figure 7, it should be noted that the jack, 110, for reverse movement is not provided with a stroke limiter. In fact the lever 110a for control of reverse movement, and in consequence the spindle 69 to which it is keyed, must, in order to control the reverse movement, occupy an angular position more displaced towards the exterior than that taken by the lever 115a for forward movement. It will be noted that the lever 110a pushed by the jack 110, in its rotation at first cuts the contact 99 on encountering the push-rod 124 and then, continuing its rotation, escapes from the latter, but then it is the jack 110 which itself pushes the push-rod 124 and is stopped by the same when it is pushed to the end. The electrically-operated valve for reverse movement therefore ceases to be excited, as the others, when the reverse movement combination is in mesh.

It will be seen from Figures 7, 10, 11, that, whatever the forward speed combination which is to be put in mesh by one of the spindles 68, 69, owing to the action of a jack, the safety jack which is associated with it will come up against the side of the lever opposite to it if it is inclined towards it and will push it again into the neutral position on striking against this side; this operation will be carried out before the speed combination can be put into mesh.

Likewise, before the reverse movement combination can be put into mesh through the jack 110, the spindle 68 will have been put back into the neutral position, if it was not there, by the abutment of the safety jack 111 against a special lever 125 solid with the spindle 68. On the other hand, through the manual control of putting the speed combinations into neutral position, which actuates the jacks 112, 113 (Figure 9), that one of the spindles 68 or 69, which was in an inclined position, will be straightened by the piston of the jack 112 or 113 opposite to it encountering one or the other of the ends of the straight side of one of the cams 126, 127 solid respectively with the spindles 68, 69. At the end of the stroke of the jacks 112, 113, the spindles 68, 69 will be locked in neutral position. In this position the cams rest on the push-rods 124 and cut the current across the electrically-operated valve EVN for putting to neutral point.

The fluid which may escape through the pistons of the jacks for forward or reverse movement is collected in the end compartments 128, 129 of the control box, from which it returns to the tank.

We claim:

1. A selector switch for use in establishing gear combinations between a vehicle engine and associated wheels in accordance with the speed of the vehicle comprising: a shaft rotatable in proportion to the speed of the vehicle, commutators coupled to and rotating with the shaft, contacts adapted for being coupled to the commutators for the transmission of electrical signals, flexible springs coupled to said shaft and rotatable therewith, said springs being individually responsive to different centrifugal forces for displacement, said contacts being mounted on said springs and being displaceable therewith for being coupled to said commutators, and means engaging the springs for controlling the displaceability thereof in response to centrifugal forces, wherein said means comprises elastic devices engaging said springs in a direction radially of said shaft for supplementing the centrifugal forces.

2. A switch as claimed in claim 1 wherein said devices each comprise: a helical spring and a push rod engaging the helical spring for compressing the same.

3. A switch as claimed in claim 2 wherein the means further comprises a Bowden cable for engaging the push rods and a ball intermediate each cable and rod for the transmission of forces therebetween.

4. A selector switch for use in establishing gear combinations between a vehicle engine and associated wheels in accordance with the speed of the vehicle comprising: a shaft rotatable in proportion to the speed of the vehicle, commutators coupled to and rotating with the shaft, contacts adapted for being coupled to the commutators for the transmission of electrical signals, flexible springs coupled to said shaft and rotatable therewith, said springs being individually responsive to different centrifugal forces for displacement, said contacts being mounted on said springs and being displaceable therewith for being coupled to said commutators, and means engaging the springs for controlling the displaceability thereof in response to centrifugal forces, comprising an inertia device mounted on said shaft and coupled to said flexible springs for feeding signals to the flexible springs, said inertia device including slidable contacts responsive to changes in speed of the shaft for the feeding of the signals to the flexible springs.

5. A switch as claimed in claim 4 wherein the inertia device comprises a flywheel rotatable on the shaft, a spiral spring coupled between the shaft and flywheel and having a predetermined resistance to relative rotation between the flywheel and shaft, a relative rotation of the flywheel and shaft controlling the slidable contacts.

6. An automatic control device for a gear-box of an automobile, comprising: levers controlling the gear-box; individual hydraulic jacks for the control of each of the levers; electrically-operated valves delivering to the said jacks orders in the form of impulses; and a speed selector driven in rotation by the transmission of the vehicle, the said selector sequentially exciting, for given speeds of the vehicle, said electrically-operated valves; said selector comprising a member turning at a speed controlled by the gear-box, flexible leaves on said member and including free ends, stops spaced from one another and operatively associated with the free ends to be contacted selectively thereby, each of said leaves having respective pre-stresses to contact one stop with the centrifugal force less than a certain value and to be projected by centrifugal force, to contact the other stop, the said stops being connected to the valves, the said leaves having respectively different responses to centrifugal force.

References Cited in the file of this patent

UNITED STATES PATENTS

| | | |
|---|---|---|
| 380,824 | Schlepegrell | Apr. 10, 1888 |
| 2,210,237 | Fuhrer | Aug. 6, 1940 |
| 2,218,136 | Price | Oct. 15, 1940 |
| 2,252,009 | Kenny | Aug. 12, 1941 |
| 2,761,031 | McDonald | Aug. 28, 1956 |
| 2,802,916 | Adams et al. | Aug. 13, 1957 |